United States Patent [19]
Kaufmann et al.

[11] 3,850,749

[45] Nov. 26, 1974

[54] PREPARATION OF OLIGORIBONUCLEOTIDES

[75] Inventors: Gabriel Kaufmann; Uriel Z. Littauer, both of Rehovot, Israel

[73] Assignee: Yeda Research and Development Co., Ltd., Rehovoth, Israel

[22] Filed: June 12, 1972

[21] Appl. No.: 262,143

[30] Foreign Application Priority Data

June 11, 1971 Israel.................................... 37076

[52] U.S. Cl. ...................... 195/28 N, 260/211.5 R
[51] Int. Cl............................................. C12d 13/06
[58] Field of Search................................. 195/28 N

[56] References Cited
UNITED STATES PATENTS 3,594,278   7/1971   Naylor............................ 195/28 N

OTHER PUBLICATIONS

Thach et al., Science, Vol. 148, pages 632–634, (1965).

Primary Examiner—Alvin E. Tanenholtz
Attorney, Agent, or Firm—Hubbell, Cohen & Stiefel

[57] ABSTRACT

A process for the preparation of oligoribonucleotides of definend predetermined sequence containing the natural 3'-5'-internucleotide linkage, which comprises reacting an oligonucleotide with a monofunctional substrate in the presence of polynucleotide phosphorylase, to form a product which is longer, by one monomeric unit than the initial oligonucleotide, isolating the product from the reaction mixture, removing the blocking agent and repeating the process a desired number of times, adding by each step a desired unit until the desired product of predetermined length and sequence is obtained.

6 Claims, No Drawings

PREPARATION OF OLIGORIBONUCLEOTIDES

BACKGROUND OF THE INVENTION

Similar methods, both chemical and enzymatic have been described in the literature, see for example Lohrman et al, JACS 88, 819 (1966). Thach et al., Science 147, 1310, 148, 632 (1965). The hitherto described methods are limited to rather short oligonucleotides, containing not more than 4 to 5 monomer units in the chain. The novel method according to the present invention provides the possibility of gradually building up chains of predefined sequence of greater length than hitherto possible.

SUMMARY OF THE PRESENT INVENTION

A process for the preparation of oligoribonucleotides of defined predetermined sequence containing the natural 3'-5'-internucleotide linkage, which comprises reacting an oligonucleotide with a monofunctional substrate in the presence of polynucleotide phosphorylase, to form a product which is longer, by one monomeric unit than the initial oligonucleotide, isolating the product from the reaction mixture, removing the blocking agent and repeating the process a desired number of times, adding by each step a desired unit until the desired product of predetermined length and sequence is obtained.

According to the present invention the polymerization of ribonucleoside diphosphate by *E.coli* polynucleotide phosphorylase (EC 2.7.7.8) which normally leads to the formation of long chain random polymers, can be modified so that each step of the controlled reaction results in the addition of a single nucleotide-monophosphate unit to a pre-existing oligonucleotide chain. This controlled addition reaction, resulting in the addition of one and only one single additional unit is brought about by the attachment of a suitable blocking group to the ribose moiety of the ribonucleoside diphosphate substrate. Blocked ribonucleoside diphosphates (termed monofunctional substrates herein) which undergo this addition reaction, restricted to the addition of a single unit of nucleotide residue, are used for the stepwise synthesis of oligoribonucleotides of predefined sequence. This controlled addition and stepwise build up of the desired products is effected as follows: A desired oligonucleotide is reacted with a "monofunctional substrate" of choice in the presence of a suitable enzyme, such as polynucleotide phosphorylase (either in soluble or in polymer-bound water insoluble form). This results in a product which is longer by one monomeric unit than the initial oligonucleotide. The product is isolated from the reaction mixture and the blocking group is removed by a mild treatment such as mild alkali treatment. The obtained oligonucleotide is then utilized for a further elongation step, in which it serves as initiator, being reacted as set out above with another "monofunctional substrate". This sequence of stepwise addition is continued until the desired chain-length is reached.

For the stepwise synthesis of oligonucleotides of defined, predetermined sequence, the monofunctional substrates have to meet the following requirements:

a. The reaction results in each of the steps in the addition of a single nucleotide moiety;

b. The blocking group is of such nature as to be stable under the reaction conditions of the addition reaction, but is removable by a mild treatment which does not damage the oligonucleotide chain.

Many 2'(3'-O-acylnucleoside diphosphates fulfil the above requirements. These derivatives which are easily and rapidly prepared from a widely available range of commercial carboxylic acids are relatively stable at a neutral pH, but can be hydrolyzed by mild alkali.

Various 2'(3')-O-acyl nucleoside diphosphates were prepared and tested for their suitability in the reaction according to the present invention. Among those found suitable for the process according to the invention there may be mentioned the following 2'(3')-O-acyl esters of ADP, GDP, UDP, CDP, IDP and XDP: propionyl, butyryl, valeryl, isobutyryl, isovaleryl and orthomethoxybenzyl esters (which gave very good results); and the benzoyl and phenylacetyl esters (which gave satisfactory results). It is clear that also other 2'(3')-O-acyl esters of nucleoside diphosphates may be used.

DESCRIPTION OF THE PREFERRED EMBODIMENT

In the following there is described by way of example only, the preparation of a typical 2'(3')-O-acyl nucleoside diphosphate and the use of such derivatives for the stepwise preparation of an oligoribonucleotide of desired predefined sequence. As pointed out above, the process can be started with any desired natural ribooligonucleotide of, for example, 2 to 4 units, and a desired oligoribonucleotide of predetermined sequence and length can be built up by a sequence of stepwise additions of the desired units.

Synthesis of a monofunctional substrate; 2'(3')-O-isovaleryl ADP 102 mg (1 mmole) of isovaleric acid in 0.2 ml dimethylformamide are reacted with 162 mg (1 mmole) N, N', carbonyldiimidazole (K and K Laboratories, Inc.) at 25°C. After 10 minutes 0.4 ml of aqueous 0.25 M $Na_3ADP$ is added and the incubation continued for 3–5 hours. At the end of the incubation the reaction mixture is extracted thrice with 2 ml diethyl-ether. The aqueous phase is diluted with 0.5 ml 50 percent acetic acid, applied as a narrow band to 50 × 50 cm chromatography paper (Schleicher and Schul, green ribbon No. 589) and chromatographed 6–8 hours with n-butanol: acetic acid, water 5:2:3. The chromatogram is dried and viewed under a u.v. lamp. The 2'(3')-O-isovaleryl ADP ($R_f = 0.48$) is eluted from the paper with water, lyophylized to dryness redissolved in 10 ml water and passed through a Dowex 50 × 8 $H^+$ form (Bio-Rad) 1 × 10 cm column. The column is washed with 10 ml of water and the effluents are combined. The pH of the solution is adjusted to 6.0 with in NaOH. The solution is concentrated by lyophylization to 0.01 M – 0.05 M concentration and kept frozen. The yield obtained is 60 percent. 2'(3')-O-isovaleryl-ADP may be prepared alternatively as follows: 40 μl of isovaleric anhydride are added to 0.5 ml of an 0.2 M solution of $Na_3ADP$ in 2 M aqueous imidazole. The mixture is stirred 2 hours at 37°C. At the end of the incubation the mixture is directly applied to chromatography paper. The chromatographic separation and the work up conditions are identical with those described above. The yield of 2'(3')-O-isovaleryl ADP in the latter procedure is 50 to 60 percent. 2'(3')-O-isovaleryl derivatives of GDP, UDP and CDP are prepared with either of the above methods. The yields of these derivatives vary between 30 and 50 percent.

Example of monoaddition reaction catalyzed by *E. coli* polynucleotide phosphorylase:

Preparation of 2'(3')-O-isovaleryl ApApApA from ApApA and 2'(3')-O-isovaleryl ADP.

The reaction mixture (0.1 ml) contained 20 mM 2'(3')-O-isovaleryl-ADP, 2 mM ApApA, 100mM Tris-Hcl, pH8.5, 2mM $MnCl_2$, and 4 units of purified *E. coli* polynucleotide phosphorylase. Following incubation at 37° the formation of higher oligonucleotides was followed by paper electrophoresis at pH 1.9. As a result of the reaction ApApA was converted mainly to a new oligonucleotide which migrated on the paper like ApApApA marker and was subsequently identified as 2'(3')-O-isovaleryl ApApApA. The isolation of the product oligonucleotide 2'(3')-O-isovaleryl ApApApA is effected by paper electrophoresis of the reaction mixture on No. 589 green ribbon chromatography paper (Schleicher and Schull) for 60 minutes at 50 volt/cm in the pH1.9 system. The electrogram is dried and viewed under a U.V. lamp. 2'(3')-O-isovaleryl ApApApA migrates in a manner similar to that of ApApApA marker with $R_{ApApA}$ of 0.8. The product is eluted from the paper with 2 ml water and concentrated by lyophilization. The yield of this product was 70 percent. The 2'(3')-O-isovaleryl blocking group is removed quantitatively by 2 hour incubation in 50 percent aqueous methanol saturated with ammonia. $(Ap)_3C$, $(Ap)_3G$ and $(Ap)_3U$ are synthesized from $(Ap)_2$ and 2'(3')-O-isovaleryl derivatives of CDP, GDP and UDP respectively in a similar manner.

Example of a stepwise synthesis of a short oligoribonucleotide by 3 consecutive monoadditions: synthesis of UpUpUpGpApApG from UpUpUpG (a) UpUpUpG — This oligonucleotide is obtained byT1 ribonuclease digestion of poly U, G (3:1) followed by acid hydrolysis of the 3'-terminal cyclic phosphate and subsequent removal of the 3'-terminal phosphate by *E.coli* alkaline phosphatase. The $(Up)_nG$ mixture is then separated on a DEAE cellulose column by a linear gradient of triethylammonium bicarbonate buffer pH 7.6. 6000 $A_{260}$ units of polymer yield 600 $A_{260}$ units of $(Up_3)G$ oligonucleotide.

(b) UpUpUpGpA — UpUpUpG is reacted with 2'(3')-O-isovaleryl ADP in the presence of polynucleotide phosphorylase. The molar concentration of the reactants and the incubation conditions of this reaction were similar with those described for 2'(3')-O-isovaleryl ApApApA synthesis. At the end of the incubation the reaction mixture is boiled for 2 minutes, chilled, diluted to 50 ml with water and incubated for 3 hours with *E.coli* alkaline phosphates (0.1 units per umole nucleoside diphosphate). The solution is extracted with 15 ml chloroform: isoamyl alcohol 24.1 to remove the alkaline phosphatase, the aqueous layer is saved, lyophilized and the residue dissolved in 5 ml aqueous 50 percent methanol saturated with ammonia. After 2 hours at 25°C the solution is evaporated in vacuo at room temperature,the residue is dissolved in 100 ml 0.005 M triethylammonium bicarbonate pH 7.6, applied to a DEAE cellulose colunmn (0.7 meg./g) 1 × 20 cm. and eluted with a linear gradient of triethylammonium bicarbonate, pH 7.6 consisting 1L each of 0.005 M and 0.5 M solutions. UpUpUpGpA is eluted between 0.21 and 0.24 M buffer concentration. From 7.5 μmole UpUpUpG, 2 μmole UpUpUpG, 2 μmole UpUpUpGpA are obtained. The resulting UpUpUpGpA solution is repeatedly lyophylized and dissolved in water in order to remove the volatile buffer.

(c) UpUpUpGApA—$(Up)_3GpA$ is reacted with 2'(3')-O-isovaleryl ADP in presence of polynucleotide phosphorylase as described for the synthesis of UpUpUpGpA. $(Up)_3GpApA$ is eluted from the DEAE cellulose column between 0.28 and 0.30 M buffer concentration. 0.6 μmole$(Up)_3$ GpApA are obtained from 1 μmole $(Up)_3GpA$.

(d) $(Up)_3GpApApG$ — 0.6 μmole of $(Up)_3GpApA$ are reacted with 12 μmole of 2'(3')-O-isovaleryl ($C^{14}$) GDP in the presence of polynucleotide phosphorylase as described for the synthesis of UpUpUpGpA. Following 30 minutes incubation at 37°C, the reaction mixture is treated as described above in sections (a) and (b) except that separation is performed by means of electrophoresis on DEAE paper in 7 percent formic acid for 8 hours at 30 vol/cm. Under these conditions UpUpUpGpApApG migrates 8 cm. UpUpUpGpApApG is eluted from the elctrogram with 2 M triethylammonium bicarbonate buffer pH 9.5 and desalted by repeated coevaporation with water. 0.25 μmole UpUpUpGpApApG are obtained from 0.6 μmole UpUpUpGpApA.

Stepwise synthesis of oligoribonucleotides using a water-insoluble derivative of polynucleotide phosphorylase:

The above described method for the stepwise synthesis of oligoribonucleotides of predefined base sequence may be modified, and used with water-insoluble polynucleotide phosphorylase instead of the soluble enzyme.

The water-insoluble derivative of polynucleotide phosphorylase may be prepared by the chemical fixation of the enzyme to cyanogen halide activated polysaccharide carriers (Eur. J. Biochem. 18 351 (1971).

In the following there is described by way of example only the preparation of a water insoluble polynucleotide phosphorylase derivative and its subsequent use for the addition of a single nucleotide monophosphate unit to a pre-existing nucleotide chain.

Chemical fixation of polynucleotide phospharylase to Sepharose 4B:

Sepharose 4B slurry (Pharmacia) is washed with water on a sintered Buchner funnel by suction and suspended finally in 5 ml $H_2O$. 5N NaOH is added to the suspension to adjust the pH to 12. 0.5 BrCN crystals are crushed in a mortar and suspended in 2 ml water. The bromo-cyanide suspension is applied to the Sepharose and the mixture is stirred vigorously. The pH is maintained at 11 by dropwise addition of 5N NaOH. After 10 minutes the suspension is transferred to a Buchner funnel with a fritted glass bottom and washed with 100 ml water followed by 100 ml of 0.1 M sodium bicarbonate adjusted to pH 7.6 with 5 HCl. The slurry (0.7 gr) is suspended with 2 ml of purified *E. coli* phosphorylase solution (Kimhi and Litteuer, J. Biol. Chem. 243 (1968) 231) previously dialyzed against 0.1 M sodium bicarbonate buffer, pH 7.6 (250 phosphorolysis units, 52 units/mg protein). The suspension is stirred for 16 hours at 4°C, transferred to a Buchner funnel with fritted glass bottom, washed with 100 ml of 0.02 M Tris buffer, pH 8.0, resuspended in 10 ml of the same buffer and packed as a 6 × 0.3 column in a Pasteur pipette.

Synthesis of 2'(3')-O-isovaleryl (Ap)₃G from ApApA and 2'(3')-O-isovaleryl GDP using a column of insoluble polynucleotide phospharylase The reaction mixture in a volume of 5.0 ml was prepared and kept at 0°C, it contained: 2mM ApApA, 20 mM isovaleryl GDP; 2 mM MnCl₂ and 200 mM Tris-HCl buffer pH 8.5. The reactants mixture was applied to the above said polynucleotide phosphorylase column at room temperature via a narrow tubing. The solution was passed through the column and collected into an ice-chilled test tube. The rate of flow was 0.1 ml/min. When the passage of the reactants mixture through the column is completed the latter is washed with 2 ml of 0.02 M Tris-HCl, buffer, pH 8.0 and the effluent combined with the previous one. The products solution is then removed and the column flushed with 0.02 M Tris-HCl buffer pH 8.0 containing 0.02 percent NaN₃. It is stored at 4°C and may be used repeatedly for various syntheses for many months.

The product solution is analysed by paper electrophoresis at pH 1.9. Under the conditions described above ApApA is quantitatively converted to 2'(3')-O-isovaleryl ApApApG.

We claim:

1. A process for the preparation of oligoribonucleotides of defined and predetermined sequence containing the natural 3'-5'-internucleotide linkage, which comprises:

(a) reacting a desired oligonucleotide with a 2'(3')-O-acyl nucleoside diphosphate in the presence of polynucleotide phosphorylase, (b) isolating the product from the reaction mixture, and (c) removing the 2'(3')-O-acyl blocking group.

2. A process as claimed in claim 1, characterized in that the polynucleotide phosphorylase is used in water-soluble form.

3. A process as claimed in claim 1, characterized in that the polynucleotide phosphorylase is used in carrier-bound insoluble form.

4. A process as claimed in claim 1, wherein the 2'(3')-O-acylnucleoside diphosphate is a 2'(3')-O-acyl ester of ADP, GDP, UDP, CDP, IDP, XDP.

5. A process as claimed in claim 1, wherein the 2'3'(-O-acyl blocking group is a propionyl, butyryl, valeryl, isobutyryl, isovaleryl or methoxybenzoyl group.

6. A process as claimed in claim 1, wherein the reaction, isolation and removal steps (a), (b) and (c) are repeated, in sequence, utilizing as the initial reactant the product isolated in the aforesaid step (b), to produce an oligoribonucleotide of any predetermined length and sequence.

* * * * *

PO-1050
(5/69)

UNITED STATES PATENT OFFICE
CERTIFICATE OF CORRECTION

Patent No. 3,850,749                    Dated   November 26, 1974

Inventor(s) Gabriel KAUFMAN and Uriel Z. LITTAUER

It is certified that error appears in the above-identified patent and that said Letters Patent are hereby corrected as shown below:

Title page, left side, under "Foreign Application Priority Data": "June 11, 1971" should read -- June 16, 1971 --.

Title page, right side under "Abstract": "definend" should read -- defined --.

Column 2, line 3: "2'(3'-O-acylnucleoside" should read -- 2'(3')-O-acylnucleoside --; line 54: "with in NaOH." should read -- with 1N NaOH. --.

Column 3, line 55: "umole" should read -- mole --; lines 61-62: "dissolved in temperature, the 100 ml." should read -- dissolved in 100 ml. --.

Column 4, line 23: "elctrogram" should read -- electrogram --.

Column 6, line 3 of claim 4: "IDP, XDP" should read -- IDP or XDP --; Column 6, lines 1-2 of claim 5: "2'3'(-O-acyl" should read -- 2'(3')-O-acyl --.

Signed and sealed this 8th day of April 1975.

(SEAL)
Attest:

RUTH C. MASON
Attesting Officer

C. MARSHALL DANN
Commissioner of Patents
and Trademarks